United States Patent

[11] 3,598,914

[72] Inventor Judson B. Synnott, III
Downers Grove, Ill.
[21] Appl. No. 878,753
[22] Filed Nov. 21, 1969
[45] Patented Aug. 10, 1971
[73] Assignee Bell Telephone Laboratories, Incorporated
Murray Hill, N.J.

[54] TERMINAL FOR COMMON CHANNEL SIGNALING SYSTEM

7 Claims, 2 Drawing Figs.

[52] U.S. Cl. .......... 178/58, 179/2 DP, 179/15 BS, 179/18 J
[51] Int. Cl. .......... H04l 7/08
[50] Field of Search .......... 179/2 DP, 15 BY, 15 BS, 15 AE, 18 J; 178/23

[56] References Cited

UNITED STATES PATENTS

| | | | |
|---|---|---|---|
| 3,327,288 | 6/1967 | Webber | 179/2 DP |
| 3,458,654 | 7/1969 | Ohnsorge et al. | 178/23 |
| 3,504,287 | 3/1970 | Deregnaucourt | 179/15 BS |

*Primary Examiner*—Kathleen H. Claffy
*Assistant Examiner*—David L. Stewart
*Attorneys*—R. J. Guenther and James Warren Falk

ABSTRACT: A common channel signaling system has a duplex signaling channel equipped with terminals that are adapted to maintain a constant data rate by inserting idle words when there are no data words to be transmitted and by inserting an additional synchronizing word when the error control information obtained by analyzing a block of data from a remote terminal is not completed within a predetermined interval before the arrival of the word position which is normally intended to contain such error control information.

INVENTOR
J. B. SYNNOTT III
BY Howard R Popper
ATTORNEY

TERMINAL FOR COMMON CHANNEL SIGNALING SYSTEM

BACKGROUND OF THE INVENTION

This invention relates to data transmission systems and more particularly to a common channel signaling system of the type described, for example, in the copending application of W. B. Smith and J. B. Synnott III, Ser. No. 831,006, filed June 6, 1969.

Heretofore data transmission systems have been known in which the signaling channel connecting two terminals is in continuous operation and in which idle words are injected by the terminal whenever there are no data words available to be transmitted. In some applications, this approach is found to be desirable because it avoids the necessity of bringing the transmitting and receiving ends of the signaling channel into synchronization each time the stream of actual data words is interrupted as when there is no data to be sent. Since the system is in continuous operation, delays occasioned by the need to resynchronize may largely be avoided. However, even though the system may continuously be transmitting actual data, the mutilation of a data word or, in some systems, of an idle word, may be so bad as to cause loss of synchronization. Under these circumstances, a resynchronization procedure must be followed. The ability to resynchronize is an inescapable requirement of almost any conceivable signaling system.

In the copending application of W. B. Smith et al. mentioned above, there is described an interoffice common channel signaling system using stored program controlled data processing equipment at each terminal. The program-controlled data processor supervises the loading of the transmitter from the storage unit at the terminal and erases the transmitted words from the storage unit when the distant terminal has forwarded error control information in the form of a BLOCK word which verifies that all of the transmitted words constituting an integral message have been correctly received at that distant terminal. In that application, data messages stored in the storage unit of the processor might be either single word or multiword messages. The multiword messages might on some occasions be distributed over more than one transmitted block. Accordingly, the processor was charged with the task of not releasing a multiword message from storage even though a BLOCK word indicated that some of the words which were contained in a previously transmitted block had been correctly received. Only when all of the words of a message in each of the blocks in which they happen to have been transmitted were identified as correctly received could the words constituting the message be erased from memory.

In the data transmission system disclosed in the above-mentioned Smith-Synnott application, it was desired that starting up delays be avoided and to this end the system was kept in continuous operation. Idle words were sent when there were no available data words to be sent. Accordingly, the previous system exhibited an inherent degree of synchronization between the transmitter at one terminal and the receiver at the other terminal of the transmission channel. Because the transmitters at each terminal would be controlled by individual clocks and these clocks would not operate at exactly the same rate, it was possible for the terminal having the faster transmitter to transmit all or part of a second block of data during the time that the transmitter at the slower terminal was still in the process of transmitting a first block of data. Under these circumstances, the terminal with the slower transmitter would have received more than one block of data from the terminal with the faster transmitter and might have formulated error control words for these blocks. Because its transmitter was operating slowly it would have perhaps two error control words on hand when it was finally able to send a BLOCK word. Under these circumstances, the faster terminal would have to store all of the data for two transmitted blocks and might interpret the block word which it finally received as applying to the wrong one of these stored blocks of data. Accordingly, a new terminal has been designed which controls the data rate of its transmitter so that it will be unnecessary to store an excessive amount of data because the transmitter at a remote terminal is slower in acknowledging the receipt of messages.

In the aforementioned data transmission system the terminal was adapted to detect idle words that were received over the signaling channel and to prevent the transmission of such idle words to the central processor. This saved central processor operating time inasmuch as there would be no need to require the distant terminal to retransmit an idle word even if it were distorted in transmission. Though idle words were thus individually detected, if all of the words which a terminal happened to receive in a data block were idle words, it would still have to use its associated processor to fabricate a BLOCK word for transmission back to the distant terminal because the distant terminal always expects to receive error control information pertaining to its last transmitted block. The distant terminal, however, was not enabled in the aforementioned disclosure to distinguish BLOCK words relating to idle blocks from BLOCK words acknowledging the transmission of actual data. Accordingly, the central processor at the distant terminal was required to process such "completely idle" BLOCK words resulting in some degradation of central processor operating efficiency. Accordingly, it would be desirable to prevent BLOCK words which merely acknowledge the transmission of blocks containing nothing but idle words from being processed by the central processor.

SUMMARY OF THE INVENTION

The foregoing and other objects of the present invention are achieved in one illustrative embodiment in which the terminal includes a transmitter word list, a receiver word list, and a mode control circuit for selectively transferring words from the transmitter and receiver word lists to the transmitter and receiver buffer circuitry to establish synchronization with the remote terminal and to prevent the difference in transmitting rates of the terminals from causing loss of synchronization.

In accordance with one aspect of the operation of the system of the present invention, the transmitter at the terminal at each end of the signaling channel will transmit a series of RESYNC words until the receiver at that terminal has received a RESYNC word from the remote terminal. At this point the transmitter is instructed to send SYNC words to the remote terminal. Following the correct receipt of a SYNC word, the remote terminal will send two more SYNC words followed by data words from the transmitter buffer. According to this aspect of the operation of the illustrative embodiment, a terminal changes to data transmission whenever it has been simultaneously receiving and sending SYNC words for two consecutive word intervals.

In accordance with another aspect of the operation of the illustrative embodiment, the receiver at a terminal analyzes the data words received from the distant terminal and formulates error control information which is to be passed to the transmitter and transmitted by that transmitter in the form of a BLOCK word to the distant terminal. During the synchronization procedure, if the receiver at the terminal has not yet formulated error control information because of a time delay in the transition from SYNC words to data at the transmitter of the distant terminal, the receiver will notify the terminal control circuitry to cause the transmitter to insert a SYNC word in place of the BLOCK word which would normally be transmitted to the remote terminal. In this manner, the first BLOCK word transmitted corresponds to the first complete block of data received. Synchronization is complete when both terminals have transmitted and received an initial BLOCK word.

Once the terminals at each end of the channel are synchronized data words and BLOCK words will be continuously sent in both directions. Advantageously, the receiver at a terminal should formulate error control information in sufficient time for it to be available for insertion into the BLOCK word about to be sent by its associated transmitter.

When, however, the receiver at a synchronized terminal formulates error control information within too small an interval before that data is to be transmitted in a BLOCK word, a condition which may be caused by a slow transmission rate of the transmitter at the distant terminal, the receiver will notify the terminal control circuitry to cause the transmitter to send a SYNC word immediately following that BLOCK word. In this manner, the receiver at a terminal which is constrained in its formulation of its error control information by the slow transmission rate of the remote terminal causes its associated transmitter to insert a SYNC word following a BLOCK word, thereby extending the length of that particular block of data and reducing the transmitter's rate of effective data transmission.

DESCRIPTION OF THE DRAWING

The foregoing and other objects and features may become more apparent by referring now to the detailed description and drawing in which.

DETAILED DESCRIPTION

Figure 1:
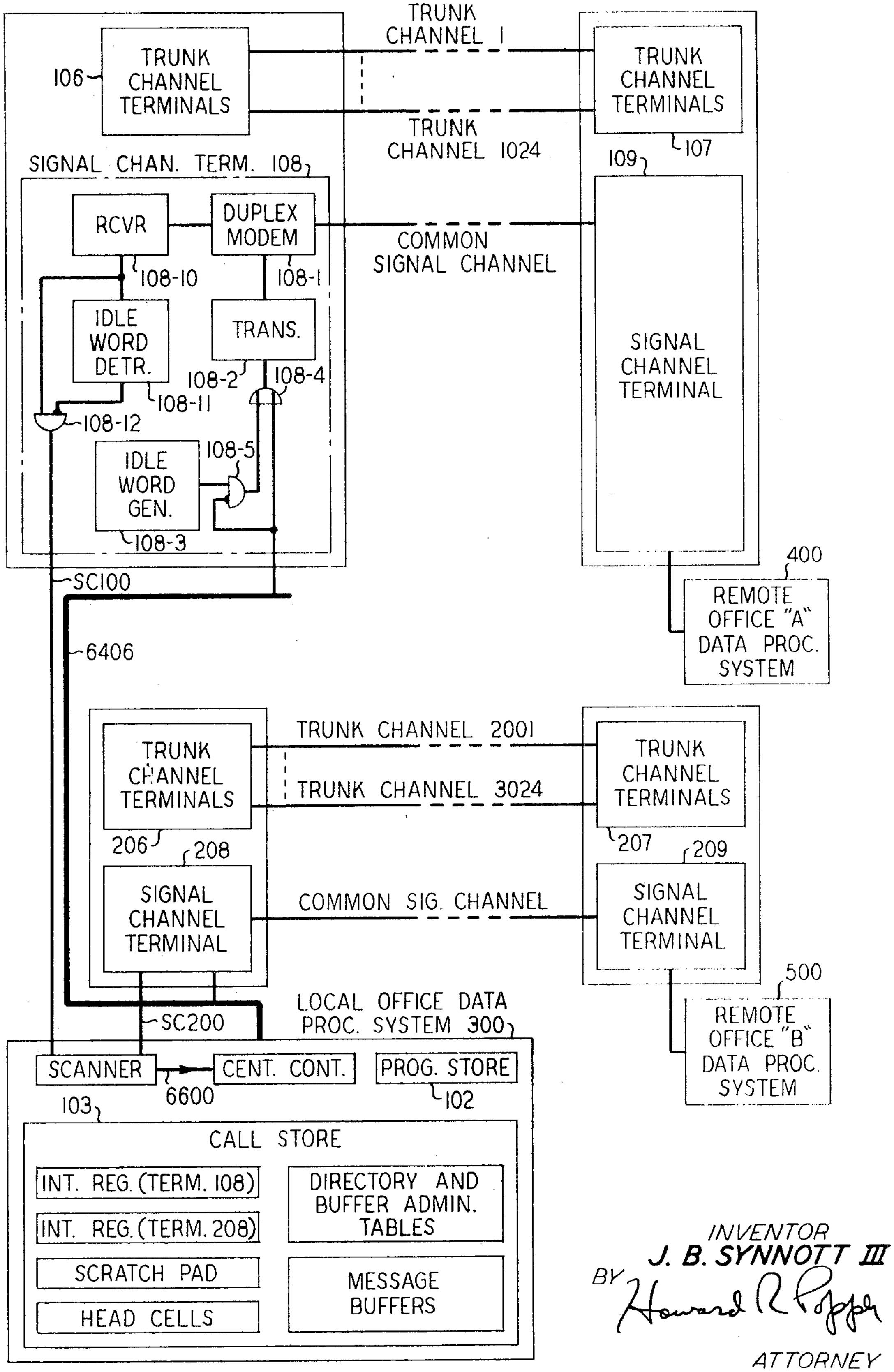
FIG. 1 shows in block diagram form an overall schematic view of a common channel signaling system including terminals of the type disclosed in the aforementioned copending application of W. B. Smith and J. B. Synnott III.

Referring now to FIG. 1, there is shown a data transmission system employing common channel signaling. This system will be described with respect to a local central office which contains data processing system 300, trunk channel terminals 106 and 206 and common signal channel terminals 108 and 208. Remote from the central office comprising the aforementioned equipment are two distant central offices "A" and "B" which are accessible for communications purposes over a plurality of trunk channels 1–1024 and 2001–3024, respectively. At office "A" are trunk channel terminals 107, common signal channel terminal 109 and data processing system 400 which, in all respects may be similar to local office data processing system 300. At remote office "B" there are, similarly, trunk channel terminals 207, signal channel terminal 209 and data processing system 500.

Trunk channels 1–1024 may be thought of as carrying individual voice conversations between the local central office and remote office "A" and the common signaling channel extending between terminals 108 and 109 may be thought of as carrying the information necessary for setting up connections to and from the trunk channel terminals 106 and 107 at the respective offices. The signaling information carried over the common signaling channel would typically include such information as the called telephone number which is transmitted in the forward direction from the calling to the called office and answer supervision which is transmitted in the reverse direction. In this regard, the called telephone number would in most instances be in the form of a multiword message whereas answer supervision would normally be expected to be a single word message.

Normally data words are supplied by central processor system 300 over bus 6406 to terminal 108 for transmission over the common signaling channel. When data words are present on bus 6406 inhibit gate 108–5 in terminal 108 is inhibited. However, when there are no actual data words available in call store 103 to be placed on bus 6406 inhibit gate 108–5 is unblocked and idle word generator 108–3 provides a word to transmitter 108–2 for transmission over the common channel via duplex modem 108–1.

Since it is desired that data processing system 300 not be burdened by considering idle words that are received at terminal 108 over the common signaling channel, an idle word detector 108–11 is associated with receiver 108–10 such as the idle word detector 108–11 will activate the inhibit terminal of gate 108–12 to prevent receiver 108–10 from delivering an idle word to the scanner of data processing system 300. The information which receiver 108 is permitted to deliver to data processing system 300 is entered by the scanner thereof over cable 6600 into one of the internal registers of the common control of the data processing system. In the normal course of events this register places the information into call store 103 in an interface register thereof assigned to terminal 108. Similarly, data processing system 300 scans the receiver output associated with signal channel terminal 208 and eventually inserts the information provided therefrom into a call store interface register assigned to terminal 208. The central control and call store 103 may advantageously be of the type described in detail in the copending application of R. W. Downing et al., Ser. No. 334,875, filed Dec. 31, 1963 and in the Bell System Technical Journal, Sept. 1964, particularly pages 1,845 through 1,959 dealing with the central processor organization and the stored program organization and pages 2,021 through 2,054 dealing with the peripheral bus system. Reference may also be made to the copending application of J. A. Harr, Ser. No. 590,928 filed Oct. 31, 1966, for further information concerning the basic data processing system employed in the illustrative embodiment.

Figure 2:
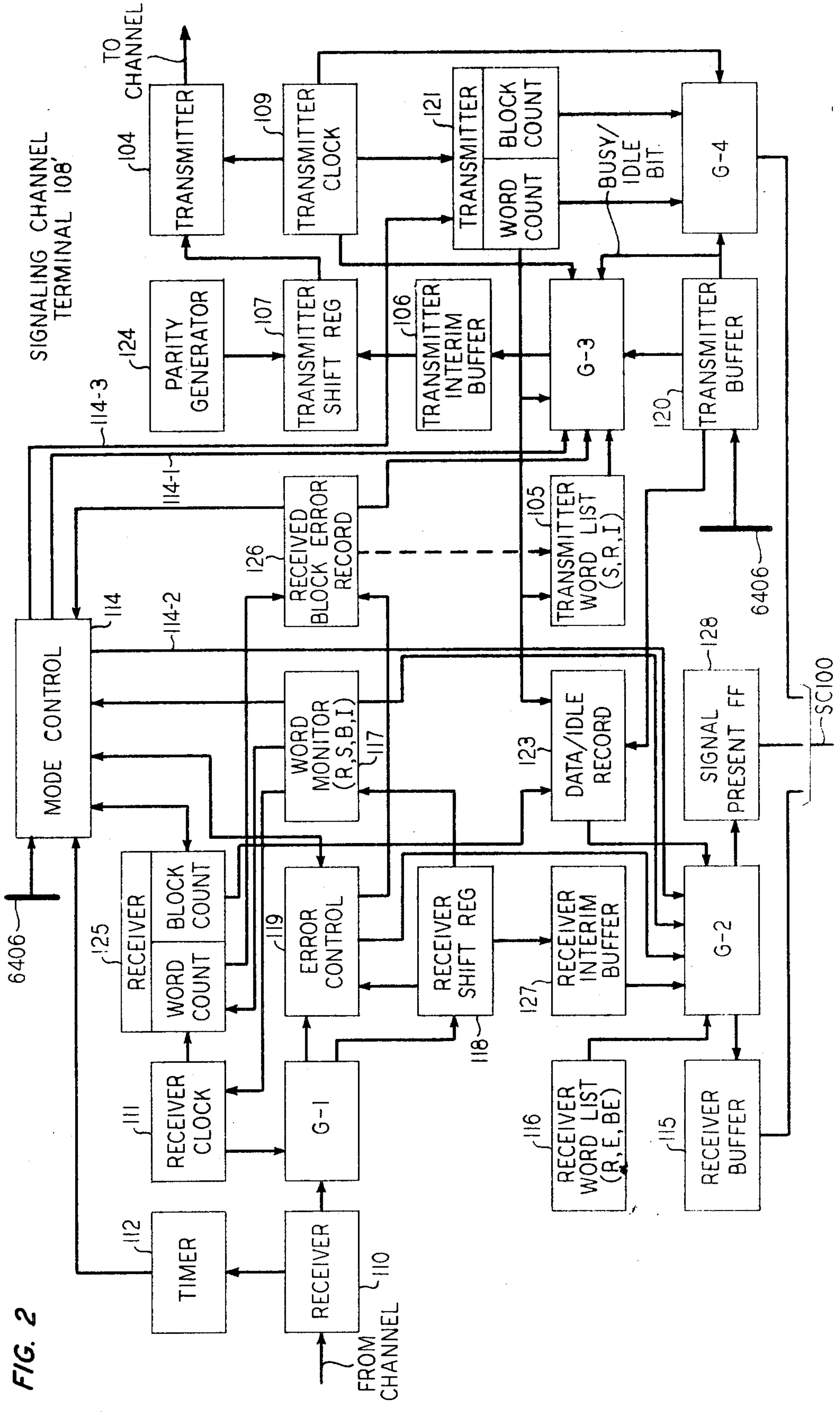
FIG. 2 shows the improved terminal of the present invention to be used in the system of FIG. 1.

Referring now to FIG. 2, there is shown the improved data terminal of the present invention. The principal elements of the signaling channel terminal 108' are, of course, the receiver 110 and transmitter 104. In this regard it should be noted that while the reference number 108' has been chosen to correspond to the signaling channel terminal 108 (FIG. 1 herein and also of the above-mentioned copending application of W. B. Smith and J. B. Synnott III), the remaining reference numbers in the ensuing description will not in general correspond to the items of structure disclosed in that case because the additional number of components described herein makes parallel numbering inconvenient.

The transmitter 104 and receiver 110 of FIG. 2 may advantageously comprise a data set capable of operating at 2,000 bits per second over a standard telephone transmission circuit. The receiver advantageously may be of the type which derives bit synchronization from the incoming data transmitted by the remote terminal. The synchronization thus achieved by receiver 110 is used to control the receiver clock 111 over a synchronizing path (not shown). Receivers capable of deriving synchronization from the incoming data stream being well known, the details thereof need not be set forth herein. Of course, it is known that receivers are available which can maintain synchronism for a substantial interval following interruption of the data bits stream carrier. To this end it is envisioned that a conventional receiver adapted to operate at the aforementioned 2,000 bit per second signaling rate and which would have the characteristic of being able to maintain synchronism for approximately one second after carrier interruption would be desirable in practicing the present invention. Timer 112 connected to receiver 110 will, in addition to performing other timing functions hereinafter to be described, after 1 second, notify mode control circuit 114 in the event that receiver 110 detects a carrier failure. Upon such notification mode control circuit 114 initiates the sequence of operations required for reestablishing synchronization. The procedure for reestablishing synchronization is basically identical to the startup procedure which is to be employed when the system is initially placed into operation.

ESTABLISHING SYNCHRONIZATION

When the terminal 108' and the distant terminal 109' (not shown) at opposite ends of the signaling channel are initially placed in service, they are of course completely out of synchronization. Under these circumstances output 114–1 of mode control circuit 114 controls gate G3 to gate RESYNC word R from transmitter word list 105 to transmitter interim buffer 106 and thence to transmitter shift register 107. The bits of RESYNC word R which have been entered in transmitter shift register 107 are shifted out at the transmission signaling rate under the control of transmitter clock 109 and are then transmitted by transmitter 104 to the distant terminal. In addition, output 114–2 of mode control circuit 114 activates gate G–2 to convey a single RESYNC word to receiver buffer 115 from receiver word list 116. Simultaneously, gate G–2 activates signal present flag flip-flop 128. Receiver buffer 115 and signal present flag flip-flop 128 are scanned by the scanner of the local office data processing system 300 (FIG. 1) to inform the central processor as to the status of the terminal. Thus, during the initial phase of startup, the presence of a RESYNC word in receiver buffer 115 notifies central processor that the terminal is attempting to reestablish synchronization.

Word monitor 117 contains a wired logic pattern identical to the RESYNC word bit format. As receiver 110 of the terminal receives a word from the distant terminal, the bits of the word, under control of receiver clock 111 and gate G–1, are shifted into receiver shift register 118. Monitor 117 matches the pattern of bits in shift register 118 against the wired logic pattern. When word monitor 117 has successfully matched all of the bits of a word, a "frame" signal is sent by it to receiver clock 111. Word synchronization has now been obtained. Word monitor 117 now notifies mode control 114 that word synchronization has been established, and, in response thereto, mode control 114 controls gate G–3 to transfer a SYNC word, S, from transmitter word list 105 to transmitter interim buffer 106 for transmission by transmitter 104 to the distant terminal. At this point in the startup process, RESYNC words are being correctly received and SYNC words are being transmitted by the terminal of FIG. 2.

The next phase of startup commences when the distant terminal, which in all respects is similar to terminal 108' of FIG. 2, likewise achieves word synchronization and begins to transmit SYNC words to the terminal of FIG. 2. When the first such SYNC word is received by receiver 110 of terminal 108' and entered into shift register 118, it will be detected by word monitor 117 matching the contents of shift register 118 with its internally wired SYNC word bit format. At this time word monitor 117 notifies mode control 114 that a SYNC word has been received. In response thereto, mode control 114 successively controls gate G–3 to transfer two more SYNC words from transmitter 105 to transmitter interim buffer 106 so these words can be transmitted by transmitter 104 to the distant terminal. Immediately thereafter, mode control 114 controls gate G–3 to transfer a data word from transmitter buffer 120 to the transmitter interim buffer 106 for transmission by transmitter 104 to the distant terminal.

Thus far it has been assumed that terminal 108' of FIG. 2 achieved word synchronization before the distant terminal, i.e., terminal 108' switched from transmitting RESYNC words to transmitting SYNC words while receiving RESYNC words from the distant terminal. Of course, it is possible for the distant terminal to achieve word synchronization before terminal 108'. Under these circumstances, the distant terminal will send a SYNC word to terminal 108' while terminal 108' is still sending RESYNC words. When the SYNC word arrives at receiver 110 it is shifted into register 118. The SYNC word bit pattern in register 118 is recognized by word monitor circuit 117 and circuit 117 notifies mode control circuit 114. Mode control circuit 114 immediately causes gate G–3 to successively transfer two SYNC words from transmitter word list 105 to transmitter interim buffer 106 for transmission by transmitter 104 to the distant terminal. Thereafter, mode control 114 operates gate G–3 to transfer data words from transmitter buffer 12 to interim buffer 106.

From the foregoing it will be appreciated that a terminal of the present invention may change to data transmission whenever it has been simultaneously receiving and sending SYNC words for two consecutive word intervals.

RECORDING OF DATA-IDLE STATUS, TRANSMITTER OPERATION

When, as last described, mode control circuit 114 has instructed gate G–3 to commence transferring data words from transmitter buffer 120 to transmitter 104 (via the path previously detailed), mode control 114 next activates output 114–3 to set the transmitter word and block counters 121 to "0" and "1", respectively, and these counters, in turn, update the appropriate data indicator bit in data-idle record store 123 for block position one. Data-idle record 123 advantageously may comprise a small magnetic core array in which a group of cores is provided per transmitted block to register a "1" bit whenever a data word is actually transmitted in a particular word position of the block. Such transmission occurs whenever transmitter buffer 120 contains a data word at the time that gate G–3 is enabled by mode control 114. For example, when a data word is available for transmission in the first word position of block number one, the indicator bit in data-idle register 123 for the first word position in block one would be set to "1." However, if transmitter buffer 120 were empty, as indicated by the Busy/Idle Bit output lead, an IDLE word I would be gated by gate G–3 (under control of clock 109 and transmitter counter 121) from transmitter word list 105 to transmitter interim buffer 106. Simultaneously, the data indicator bit in data-idle record 123 for the first word position of block one would be set to "0." Data-idle record 123 may contain as many groups of such cores as are indicated by the maximum number of blocks to be transmitted in the round trip transit time of the common signaling channel.

As thus far described, data-idle record 123 contained a word per transmitted block, each bit position of which word was set to a "1" when the corresponding word position in the transmitted block was a data word and which was set to "0" when the corresponding word position contained an idle word. The purpose of storing this information in data-idle record 123 is to permit data-idle record 123 to provide a special indication to gate G–2 later on when a BLOCK word is returned from the distant terminal regarding the transmitted block. In the event that all of the cores in data-idle record 123 pertaining to a specific transmitted block have all been set to "0," data-idle record 123 will inhibit gate G–2 and prevent the BLOCK word received from the distant terminal from being forwarded to data processor 300. Thus, the processor will not be concerned with processing BLOCK words pertaining to completely idle blocks. Some simplification of data-idle record 123 can, of course, be achieved by merely providing one core per transmitted block which core will be set to "1" whenever any word position in the transmitted BLOCK contains a data word. Under these circumstances, gate G–2 will not be inhibited because the BLOCK word acknowledging receipt of the transmitted block by the distant terminal is not a block word pertaining to a completely idle block. However, employing a data-idle record 123 which contains a core per word position per transmitted block permits the error control field of the BLOCK word as defined in the above-mentioned copending application to be filtered as well so that the processor will receive only those error bits of the BLOCK word pertaining to word positions in which actual data words were transmitted.

Returning now to the circuitry in the right-hand portion of FIG. 2, the data, idle, SYNC or RESYNC words in transmitter shift register 107 are shifted to transmitter 104 under control of transmitter clock 109. Parity generator 124 computes the parity check bits which are to be transmitted as an appendage to each data word in the illustrative system. The parity bits computed by parity generator 124 are appended to the word in transmitter shift register 107 as the word is shifted out to transmitter 104. Transmitter clock 109 increments transmitter word and block counter 121 and periodically, gate G–4 is enabled to gate the contents of counter 121 to the scanner of the central processor 300. The transmitter word and block counter may advantageously be used by the central processor to determine the word and block assignment for data words about to be transmitted to transmitter buffer 120. The Busy/Idle Bit lead of transmitter buffer 120 inhibits the transfer of the contents of the transmitter block and word counter 121 via gate G–4 to the processor 300, thereby notifying the processor 300 that transmitter buffer 120 is filled.

After the first nine (data or IDLE) words have been transmitted by transmitter 104 to the distant terminal, a BLOCK word containing the error record of the most recently received block of data would normally be gated into transmitter shift register 107 for transmission to the distant terminal. If, however, error control circuit 119 and received block error record circuits 126 have not yet formulated this information for a complete block, gate G–3 will be controlled by the received block error record circuits 126 and the transmitter word counter 121 to transfer a SYNC word, S, from transmitter word list 105 to transmitter interim buffer 106 for transmission by transmitter 104 to the distant terminal in the block word position.

RECEIPT OF DATA WORDS AND IDLE WORDS

As the words are received in receiver 110 from the distant terminal, gate G–1 passes the words to error control 119. Error control circuit 119 derives check bits by analyzing the data bits of the word and compares the check bits with the parity bits which are appended to each incoming word. Data words are gated from receiver shift register 118 to receiver interim buffer 127 while error control circuit 119 analyzes the data bits. If a match is attained between the parity bits and the check bits, error control 119 instructs received block error record 126 to insert a "0" at the bit position marked by receiver word counter 125. Error control 119 then causes gate G–2 to transfer the data word from the interim buffer 127 to receiver buffer 115. When a correct data word has been transferred to receiver buffer 115, signal present flip-flop circuit 128 is activated to inform the central processor, which thereupon may obtain the data word by scanning receiver buffer 115.

If one of the words in the data block is an idle word, it will be so recognized by word monitor 117 detecting a bit pattern in shift register 118 corresponding to the bit pattern of its wired idle word, I. Under these circumstances gate G–2 will be blocked by word monitor 117 and so the idle word will not reach receiver buffer 115 even though it is transferred to receiver interim buffer 127.

If error control circuit 119 detects a disagreement between the parity bits appended to the received data bits and the check bits computed by examining the data bits of the received word, it sets the bit position in received block error record 126 corresponding to the word position in the received block to "1." Simultaneously, an ERROR code word E is gated from receiver word list 116 by gate G–2 to receiver buffer 115. The presence of the error word in receiver buffer 115 enables the central processor to commence the procedures described in the aforementioned copending application of W. B. Smith and J. B. Synnott III so that a multiword message, if one is currently being received, might be abandoned in anticipation of its required later retransmission by the distant terminal. In this regard it should be noted that the terminal of the present invention is not limited solely for use with a central processor which has been programmed as described in that application; i.e., one which provides for retransmitting only those words constituting an integral data word message, but may also be used in connection with a central processor which is somewhat more simply programmed to call for the retransmission of an entire block of data words when any word in the block is recorded to be in error.

A BLOCK word normally follows a predetermined number of data words to constitute a uniform length block in transmission. In the illustrative system, for example, the BLOCK word may appear after a group of nine data or idle words have been transmitted. During the startup or synchronizing mode, however, a sync word may be received by receiver 110 instead of a BLOCK word because the distant terminal may not have completed assembling the error record for the block previously transmitted by the terminal of FIG. 2 at the time when the distant terminal was to have transmitted the BLOCK word. When, under these circumstances, the terminal of FIG. 2 detects a SYNC word in shift register 118, word monitor 117 causes the word counter portion of receiver block and word counter 125 to be reset. When the first BLOCK word thereafter arrives, word monitor circuit 117 recognizes the appearance of the BLOCK word in shift register 118 and causes mode control circuit 114 to terminate the synchronizing mode by removing the signal which mode control 114 has thus far been applying to inhibit the block counter portion of receiver word and block counter 125. Simultaneously, mode control circuit 114 notifies the central processor that synchronization has been fully established by gating the SYNC word to the processor via gate G–2, receiver buffer 115 and signal present circuit 127.

In accordance with one aspect of the illustrative embodiment of FIG. 2, a receiver word and block counter 125 is provided so that arriving BLOCK words may be assigned sequential numbers and the numbers used to access the information pertaining to the block that was previously stored in data-idle record 123. In order to obtain proper registration of the assigned BLOCK word numbers with information in circuit 123 mode control circuit 114 inhibits the block counter portion of word and block counter 125 until a block of data words followed by a BLOCK word has been received. The first BLOCK word received during the final phase of the synchronizing mode corresponds to the first block transmitted.

NORMAL OPERATING MODE

During normal operation the terminal of FIG. 2 is continuously transmitting and receiving blocks of nine data or idle words followed by a BLOCK word. Receiver 110 operates asynchronously with transmitter 104 inasmuch as receiver 110 is synchronized to the transmitter of the distant terminal, whereas transmitter 104 is locally controlled by transmitter clock 109. As each BLOCK word arrives in receiver 110, is entered in shift register 118 and passed to interim register 127, the block counter information from receiver word and block counter 125 is forwarded to the central processor along with the BLOCK word. The central processor associates the BLOCK word with the area of storage in which it retains the transmitted data words corresponding to that block. It will be recalled that when data words were transferred from transmitter buffer 120 to transmitter 104 entry was made by transmitter word and block counter 121 in the appropriate register of data-idle record 123. As each BLOCK word is received in shift register 118, the block counter information in receiver and word and block counter 125 is employed to access the register of data-idle record 123 corresponding to the transmitted block. If the transmitted block, however, contained only idle words, this will be indicated in the register of data-idle record 123 for that transmitted block, and when this word is accessed data-idle record 123 will inhibit gate G–2 so that the BLOCK word in interim register 127 will not be transferred to receiver buffer 115. Accordingly, the central processor will not be concerned with processing information relating to completely idle blocks of data.

It was mentioned above that an error detected in a word in receiver shift register 118 will cause an ERROR word to be transferred from receiver word list 116 via gate G–2 to receiver buffer 115. Advantageously, a different error word, BE, may be transferred from word list 116 to receiver buffer 115 when error control 119 detects a parity failure in a BLOCK word which pertains to a nonidle block. In this manner the central processor will have information available in the receiver buffer 115 from which to monitor the error performance of the signaling channel, although no action need be taken by the processor except on errors in nonidle BLOCK words.

When error control circuit 119 detects a preselected number of errors in adjacent words arriving in shift register 118, error record 126 sends a signal to mode control circuit 114 so that the synchronizing mode will be reinitiated. In this manner mode control 114 causes RESYNC and SYNC words to be sent whenever error control circuit 119 detects errors in contiguous words that may be indicative of a possible loss of synchronization.

The word counter portions of counters 125 and 121 in the illustrative system are designed to count from 0 to 9. On the 10th count a 1 is added to the block count and the word counter is reset. The block counters count from 1 to 8 and then start over, eight blocks representing in an illustrative embodiment 1.2 seconds of round trip delay time over the common signaling channel to and from the distant terminal. This interval is sufficient to insure that each block will be acknowledged within 1 block counter cycle.

In addition to the paths previously described, mode control circuit 114 is also equipped with an input from central processor 300 bus 6406 so that the central processor may be enabled to override any of the terminal's operating modes under emergency conditions.

SUMMARY

From the foregoing it is seen that a terminal for a common channel signaling system has been described in which the processor is saved the burden of processing idle words and block words pertaining to transmitted blocks containing only idle words. BLOCK words acknowledging completely idle blocks are detected at the terminal by counting the number of the arriving BLOCK word and employing the number to access a data-idle record. The illustrative terminal sends one type of synchronizing word (the RESYNC word) until it recognizes the receipt of such RESYNC word from the distant terminal. Then a different type of synchronizing word is sent after which data words or idle words may be transmitted. In the event that a data word is not available, the IDLE word is substituted in its place. When the terminal has not yet completed assembling the error control information for a BLOCK word the SYNC word is substituted in its place. A second use of the second type of synchronizing word (the SYNC word) is made when it is determined that the transmitter of the instant terminal is operating at a faster transmission rate than the transmitter of the distant terminal. Under these circumstances the instant terminal "stuffs" such a SYNC word into the transmitted data block immediately after the transmission of the BLOCK word, thereby to slow down the rate of effective data transmission of the transmitter at the instant terminal.

It is to be understood that the above-described arrangements are illustrative of the applications of the principals of the present invention. Numerous other modifications may be devised by those skilled in the art without departing from the spirit and scope of the invention as disclosed herein.

What I claim is:

1. In a data signaling channel system having transmitter and receiver means at a terminal at each end of said channel, the combination comprising:

means for causing the transmitter means at each said terminal independently to transmit a first synchronizing word to the other terminal, means at one terminal for recognizing the receipt by said receiving means thereat of a first synchronizing word transmitted from the remote terminal, means controlled by said recognizing means for thereafter causing said one terminal to transmit a second type of synchronizing word to said remote terminal, means responsive to the receipt of said second type of synchronizing word from said remote terminal for allowing said one terminal to transmit data words to said remote terminal, means responsive to the receipt of a group of data words from said remote terminal for formulating an error control information word regarding said received group of data words and for forwarding said error control information word to said transmitter means at said one terminal, means for controlling said transmitter means to normally insert said error control information word after a predetermined number of data words have been transmitted, and means operative when said predetermined number of data words has been transmitted and said error control information word has not been provided for causing said transmitter means to transmit one of said types of synchronizing words.

2. A data signaling channel system according to claim 1 wherein said transmitter means at said one terminal transmits an idle word when no data word is available, and wherein register means are provided for storing an indication of a predetermined number of said idle words having been transmitted by said transmitter means.

3. A signaling channel system according to claim 2 wherein said receiving means at said one terminal includes means for recognizing the receipt of an error control information word from said remote terminal and means responsive to the receipt of said error control information word for accessing said register means, and means responsive to said indication being read out of said register means for causing said error control information word received from said remote terminal to be disregarded.

4. A data transmission system comprising a pair of terminals connected by a common signaling channel, each said terminal having a receiver and a transmitter, a transmitter buffer at each said terminal for holding data words to be transmitted over said channel, word register means at each said terminal having stored therein a SYNC word, a RESYNC word, and an IDLE word, means for initially transferring said RESYNC word from said word register means to said transmitter, means responsive to said receiver receiving a RESYNC word from the distant one of said terminals for causing at least one of said SYNC words to be transferred to said transmitter, means for thereafter sequentially transferring data words from said transmitter buffer to said transmitter, means controlled by said receiver for normally formulating a BLOCK word and for transferring said BLOCK word to said transmitter after a predetermined number of said data words have been transferred to said transmitter, means for inserting one of said IDLE words among said predetermined number of words whenever there is no data word in said transmitter buffer, and means for inserting said SYNC word following said BLOCK word when said receiver has not formulated said BLOCK word after said predetermined number of data words or IDLE words have been transferred to said transmitter.

5. In a data signaling channel system having transmitter and receiver means at the terminal at each end of said channel, the combination comprising:

means for causing the transmitter means at one terminal to transmit a first synchronizing word to the remote terminal, means at said one terminal for recognizing the receipt by said receiving means of said synchronizing word from said remote terminal, means controlled by said recognizing means for thereafter causing said one terminal to transmit a second type of synchronizing word to said remote terminal, means responsive to the receipt of said second type of synchronizing word from said remote terminal for allowing said one terminal to transmit data words to said remote terminal, means for controlling said transmitter means to transmit an idle word when no data word is available to be transmitted, means responsive to the receipt of a group of data words from said remote terminal for formulating an error control information word regarding said received group of data words and for forwarding said error control information word to said transmitter means at said one terminal, means for controlling said transmitter means to normally insert said error control information word after a predetermined number of data words have been transmitted, means for storing an indication when a consecutive number of said idle words equal to said aforementioned predetermined number of data words normally dictating the insertion of an error control information word has been transmitted, means for counting each error control information word received by said receiver means from said remote terminal, means for accessing said indication storing means in accordance with the count of said received error control information word, and means operative subsequent to said accessing for thereafter disregarding said error control information word when said indication storing means accessed by said error control information word indicates that said error control information word pertains to a group of said predetermined number of idle words.

6. In a channel signaling system having a pair of terminals each including means for normally inserting an idle word in the block transmitted by said terminal when there is no data word to be transmitted, means for formulating an error control word relating to a group of words received over said channel, said error control word normally being inserted in the next one of said blocks to be transmitted over said channel to the terminal originally sending said group of words, means for maintaining the effective rate of data transmission in one direction over said channel substantially equal to the effective rate of data transmission in the other direction comprising transmitter clock timing means for defining the interval during which said error control word is to be transmitted in said one of said blocks, means for inserting said error control word in said position defined by said defining means, and means for inserting an extra word in said one transmitted block following said error control word when said formulating means does not have said error control word available within a predetermined time interval before said interval defined by said defining means.

7. In a channel signaling system according to claim 6 the combination wherein each said terminal normally transmits a synchronizing word to the remote terminal until the synchronizing word transmitted by said remote terminal is received over said signaling channel and wherein said additional word inserted after said error control word is an additional one of said synchronizing words.